United States Patent Office 3,491,367
Patented Jan. 20, 1970

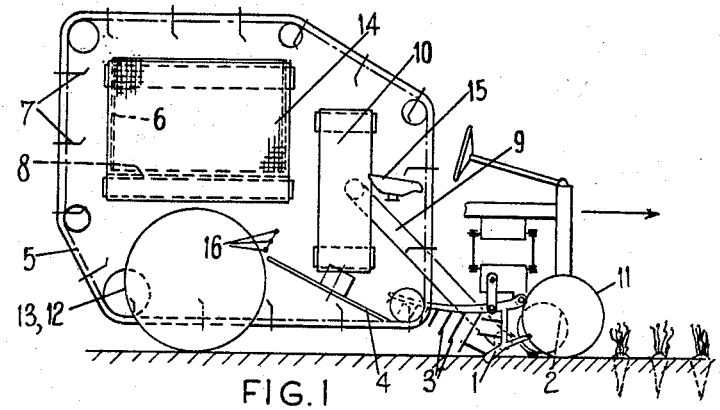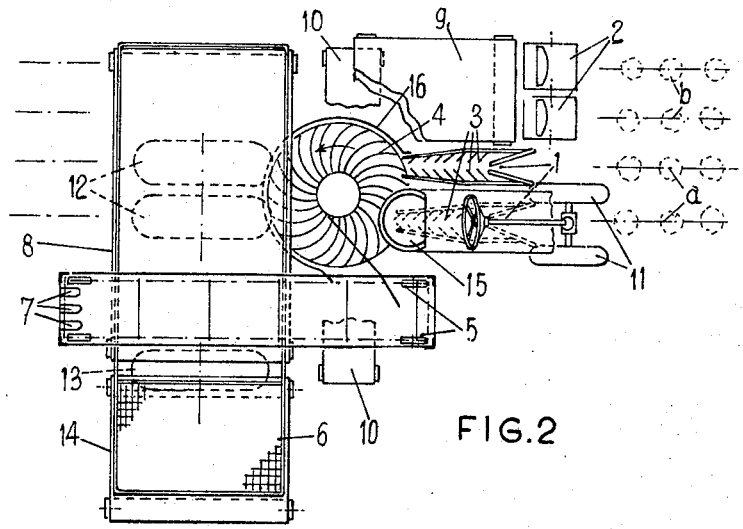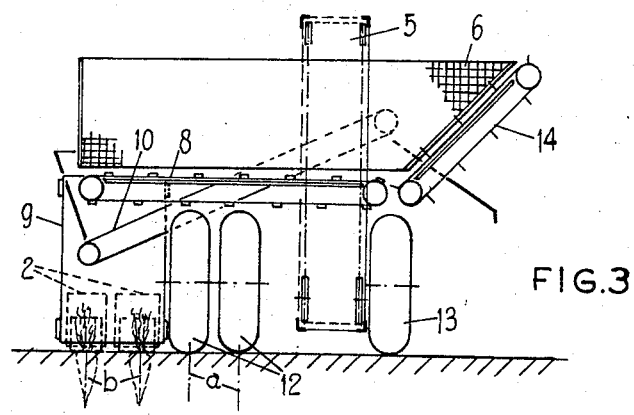

3,491,367
MACHINE FOR SIMULTANEOUSLY HARVESTING TWO OR MORE ROWS OF BEETS OR LIKE ROOT CROPS
Eugene J. E. Heyens, 176 Zoutestraat,
Hulst, Netherlands
Filed Nov. 8, 1966, Ser. No. 592,890
Claims priority, application Netherlands, Nov. 25, 1965,
6515360
Int. Cl. A01d 25/02, 27/02, 23/02
U.S. Cl. 171—115                    10 Claims

ABSTRACT OF THE DISCLOSURE

Two rows of beets over which a harvesting machine is traveling are harvested while the next adjacent two rows to one side are defoliated. The machine includes ground engaging wheels including an outboard rear wheel laterally offset to the opposite side of the machine; it also includes a receptacle centered over the rear wheels and a conveyor having a lower flight passing under the receptacle and to which the harvested beets are delivered, and an upper flight passing above the receptacle to deliver and dump the harvested beets into the receptacle. The foliage removed from the next adjacent rows of beets is conveyed across the machine and through the delivery conveyor, passing between its upper and lower flights to discharge the foliage at the other side of the machine.

---

This invention relates to a machine for simultaneously harvesting two or more rows of beets or like root crops and having a frame provided with groundwheels and harvesting means being provided for each row and a sieve wheel being arranged behind said harvesting means, said wheel receiving the beets from the harvesting means and delivers the beets on the lower part of an elevating conveyor.

The invention has for its object to improve a harvesting machine of this kind in such a manner that the sieve wheel operates as useful as possible. According to the invention the axis of the sieve wheel is located in or nearly in the central longitudinal plane, between the adjacent harvesting units. Preferably the axis of the sieve wheel is forwards inclined in said central longitudinal plane. Said arrangement presents the advantage that for both harvesting units the elevation height to the sieve wheel is equal. Moreover, the advantage is obtained that the driving gear of the sieve wheel is centrally located between the driving gears of both harvesting units whereby the possibility is reached for providing a compact gearbox for both harvesting units and the sieve wheel.

If with such a machine the elevating conveyor for the harvested beets with its upper part for discharging the beets runs over a recepacle for taking up the beets and with its lower part passes below said receptacle, a compact arrangement of the elements will be obtained, not only in transverse direction, but also in longitudinal direction by passing the conveyor discharging the leaves cut off by the cutting mechanism in transverse direction through the polygon formed by the elevating conveyor for the beets.

The invention will be further described with reference to the accompanying drawing, showing an embodiment of a harvesting machine according to the invention.

In the drawing FIG. 1 is a side view and FIG. 2 is a plan-view of the machine.

FIG. 3 is a rear-view of the machine shown in FIGS. 1 and 2.

In FIG. 2 the machine for simultaneously harvesting two rows of beets is shown in the position in which both harvesting units 1 lift the beets in both rows *a* out of the ground and both cutting mechanisms 2 cut off the leaves and the heads of the beets in both rows *b*.

Behind both harvesting units 1 which are united with cleaning grids 3, a sieve wheel 4 is located with its axis forwardly inclined and said wheel receives the beets from the grids 3 and delivers the beets on the lower part on an endless conveyor 5 having grippers 7. The upper part of said conveyor 5 delivers the elevated beets in a receptacle 6 having its bottom constituted by a horizontal conveyor 8.

The heads of the beets together with the leaves are taken over from the cutting mechanisms 2 by an elevating conveyor 9, which delivers the heads of the beets together with the leaves on a discharging conveyor 10 which passes in transverse direction through the conveyor 5 for the beets and throws the heads and the leaves of the beets on a swath beside the machine, where the beets have already been lifted out of the ground. The self-propelling machine is provided with a steered pair of fore wheels 11 and a pair of central rear wheels 12 running into line with the harvesting units 1 as well as one side wheel 13. The receptacle 6 is placed above the rear wheels 12, 13 in such a manner that the axis of said wheels is located in the vertical transverse plane passing through the centre of gravity of the receptacle and that the vertical longitudinal plane passing through said centre of gravity intersects the inner rear wheel 12. With said arrangement of the receptacle 6 the weight of the receptacle also in filled condition is completely taken up by the rear wheels 12, 13, so that the fore wheels 11 and also the harvesting units 1 will not be loaded by the filling of the receptacle 6, so that the adjustment of the depth of the harvesting units is not influenced by the load of the receptacle.

The side wall of the receptacle 6 at the unloading side is constituted by an inclined conveyor 14 adapted to pivot around a horizontal axis in order to be adjusted according to the height of the charging trough of a car for transporting the beets. For unloading the receptacle 6 the horizontal conveyor 8 is moved towards the unloading side of the receptacle, that is, to the right in FIG. 3. In order to keep also during the loading of the receptacle the weight of the filling substantially in the centre of gravity of the receptacle the driver of the machine may move the conveyor 8 from time to time oppositely to the direction of movement for unloading the receptacle. The seat 15 for the driver is located behind one of the harvesting units 1, so that the driver may keep an eye on the operation of said units and also of the cutting mechanisms 2.

As appears from FIG. 2 the active arc of the sieve wheel 4 extends through an angle of more than 240° and the wheel on said arc is surrounded by a screen 16 also serving as guide for the beets.

What I claim is:

1. A machine for harvesting beets or like root crops, comprising in combination,
   a frame adapted to travel in the direction of the rows of the crop to be harvested,
   harvesting means connected to said frame for harvesting the crop along a first row thereof,
   cutting means connected to said frame and arranged to one side of said harvesting means to defoliate the crop along a row to said one side of and adjacent the first row,
   wheel means for supporting said frame, said wheel means including main rear wheel means spaced rearwardly from and generally aligned with said harvesting means and outboard rear wheel means displaced laterally to the other side of the machine, a receptacle for the harvested crop supported on said frame above said main and outboard rear wheel means, gathering means for receiving the harvested crop from said harvesting means and feeding it laterally toward said other side of the machine, an endless conveyor having vertically spaced upper and lower flights, said conveyor being supported by said frame on said other side of the machine with the lower flight thereof passing beneath said receptacle and receiving the harvested crop forwardly thereof from said gathering means, said upper flight passing above said receptacle to dump the harvested crop thereinto, and conveyor means for receiving the cut foliage from said cutting means, said conveyor means including a portion extending transversely through said endless conveyor between the upper and lower flights thereof to discharge the cut foliage at said other side of the machine.

2. The harvesting machine as defined in claim 1 wherein said harvesting means comprises a pair of harvesting devices disposed in side-by-side relation for harvesting the crop along a first pair of adjacent rows, said cutting means comprising a pair of cutting devices disposed in side-by-side relation for defoliating the crop along a second pair of adjacent rows next adjacent and to said one side of said first pair of rows.

3. The harvesting machine as defined in claim 2 wherein said receptacle is transversely elongate and is generally centered over said main and outboard rear wheel means whereby said endless conveyor tends to dump an unbalanced load thereinto, said receptacle having an open bottom, and combined load distributing and load discharging conveyor means forming the bottom of said receptacle.

4. The harvesting machine according to claim 3 wherein said combined conveyor means comprises a first portion disposed in horizontally transverse direction to the movement of the machine and having one end substantially below said upper flight and its opposite end at said one side of the machine, and a second portion extending from adjacent said one end of the first portion in upwardly inclined direction to said other side of the machine so that relatively opposite feeding motions of said combined conveyor means respectively effect load distributing and unloading actions.

5. The harvesting machine as defined in claim 1 wherein said receptacle is transversely elongate and is generally centered over said main and outboard rear wheel means whereby said endless conveyor tends to dump an unbalanced load thereinto, said receptacle having an open bottom, and combined load distributing and load discharging conveyor means forming the bottom of said receptacle.

6. The harvesting machine according to claim 5 wherein said combined conveyor means comprises a first portion disposed in horizontally transverse direction to the movement of the machine and having one end substantially below said upper flight and its opposite end at said one side of the machine, and a second portion extending from adjacent said one end of the first portion in upwardly inclined direction to said other side of the machine so that relatively opposite feeding motions of said combined conveyor means respectively effect load distributing and unloading actions.

7. The harvesting machine as defined in claim 1 wherein said harvesting means comprises a pair of harvesting devices disposed in side-by-side relation for harvesting the crop along a first pair of adjacent rows, said cutting means comprising a pair of cutting devices disposed in side-by-side relation for defoliating the crop along a second pair of adjacent rows next adjacent and to said one side of said first pair of rows, said gathering means comprising a rotating circular screen behind said harvesting devices, said screen being disposed with its axis forwardly inclined and located within a longitudinal plane centrally located between said harvesting devices.

8. The harvesting machine according to claim 7 wherein said portion of said conveyor means passes in upwardly inclining relation from behind said cutting devices, over said screen and through said endless conveyor.

9. The harvesting machine according to claim 8 wherein said rear wheel means comprises a pair of wheels aligned behind respective ones of said harvesting devices, said outboard rear wheel means comprising a wheel laterally aligned with said pair of wheels, and said receptacle being placed such that a vertical plane passing through the axes of said rear wheels extends substantially through the center of gravity of said receptacle.

10. The harvesting machine as defined in claim 9 wherein said receptacle is transversely elongate and is generally centered over said main and outboard rear wheel means whereby said endless conveyor tends to dump an unbalanced load thereinto, said receptacle having an open bottom, and combined load distributing and load discharging conveyor means forming the bottom of said receptacle.

References Cited

UNITED STATES PATENTS 2,659,189   11/1953   Berg et al. _____ 171—115

FOREIGN PATENTS 669,482   4/1952   Great Britain.
172,203   7/1960   Sweden.

ANTONIO F. GUIDA, Primary Examiner